US008189749B2

(12) United States Patent  (10) Patent No.: US 8,189,749 B2
Jackson  (45) Date of Patent: May 29, 2012

(54) TECHNIQUES FOR HANDLING MESSAGES IN A MESSAGING SYSTEM

(75) Inventor: James Jackson, Austin, TX (US)

(73) Assignee: AT&T Intellectual Property I, LP, Reno, NV (US)

(*) Notice: Subject to any disclaimer, the term of this patent is extended or adjusted under 35 U.S.C. 154(b) by 1442 days.

(21) Appl. No.: 11/736,073

(22) Filed: Apr. 17, 2007

(65) Prior Publication Data
US 2008/0260117 A1  Oct. 23, 2008

(51) Int. Cl.
*H04M 1/64* (2006.01)
*G06F 15/16* (2006.01)

(52) U.S. Cl. ............ 379/88.22; 370/352; 379/67.1; 379/88.16; 379/88.17; 455/412.2; 455/413; 709/206; 709/218; 709/219

(58) Field of Classification Search .......... 455/412.2, 455/413; 379/67.1, 88.16, 88.17, 88.22; 370/352; 709/206, 218, 219
See application file for complete search history.

(56) References Cited

U.S. PATENT DOCUMENTS

| | | | | |
|---|---|---|---|---|
| 5,217,379 A | * | 6/1993 | Kirschenbaum et al. | 434/236 |
| 5,519,766 A | * | 5/1996 | Jones | 379/74 |
| 6,076,052 A | * | 6/2000 | Bannai et al. | 704/201 |
| 6,857,008 B1 | * | 2/2005 | Shenefiel | 709/219 |
| 7,054,939 B2 | * | 5/2006 | Koch et al. | 709/227 |
| 7,164,752 B1 | * | 1/2007 | Obilisetty | 379/68 |
| 7,251,477 B2 | * | 7/2007 | Kim | 455/412.1 |
| 7,729,478 B1 | * | 6/2010 | Coughlan et al. | 379/88.04 |
| 7,908,381 B2 | * | 3/2011 | Koch et al. | 709/227 |
| 2002/0059073 A1 | * | 5/2002 | Zondervan et al. | 704/270.1 |
| 2003/0156827 A1 | * | 8/2003 | Janevski | 386/96 |
| 2004/0042590 A1 | * | 3/2004 | Bueckers et al. | 379/67.1 |
| 2004/0174963 A1 | * | 9/2004 | Fellenstein et al. | 379/68 |
| 2006/0002524 A1 | * | 1/2006 | Bettis et al. | 379/88.22 |
| 2008/0095329 A1 | * | 4/2008 | Valco et al. | 379/88.11 |
| 2008/0313668 A1 | * | 12/2008 | Setos | 725/32 |
| 2009/0180597 A1 | * | 7/2009 | Jackson et al. | 379/88.13 |
| 2009/0202052 A1 | * | 8/2009 | Holtzberg | 379/88.23 |
| 2010/0322397 A1 | * | 12/2010 | Kale et al. | 379/88.23 |

* cited by examiner

*Primary Examiner* — Lisa Hashem
(74) *Attorney, Agent, or Firm* — Larson Newman, LLP

(57) ABSTRACT

A technique for handling messages in a messaging system includes receiving a playback request for a message. A first user control input that is associated with the playback request for the message is then received. The first user control input corresponds to a fast-forward function or a rewind function. It is then determined whether a second user control input, which corresponds to a same function as the first user control input, is received prior to expiration of a first time period. The playback request for the message is then serviced using a first offset when the second user control input is not received prior to expiration of the first time period or using a second offset, which is different than the first offset, when the second user control input is received prior to expiration of the first time period.

20 Claims, 5 Drawing Sheets

TECHNIQUES FOR HANDLING MESSAGES IN A MESSAGING SYSTEM

FIELD OF THE DISCLOSURE

The present disclosure is generally directed to a messaging system and, more particularly, to techniques for handling messages in a messaging system.

BACKGROUND

In general, the term unified messaging (UM) encompasses relatively simple architectures that provide incoming facsimiles and voicemail to an email inbox of a user, as well as more complex architectures that allow for dictating a message into a telephone, e.g., a mobile telephone, and delivering the message to an intended recipient in a variety of formats, e.g., as a text email, as a facsimile, or as a voice recording. A typical UM system integrates different streams of messages (e.g. email, facsimile, voice, video, etc.), and provides access to the messages via a variety of different devices (e.g. computer systems, landline telephones, and mobile telephones). For example, UM systems may send digitized voicemail messages and facsimiles to a mail server that distributes the voicemail messages to a user as email attachments. As another example, UM systems may convert email messages to speech (i.e., perform text-to-speech conversion) and then deliver audio messages to a remote user via a landline telephone or mobile telephone. Messaging systems, such as unified messaging systems, usually provide a telephony user interface that allows a user to listen to messages via a telephone (e.g. a mobile telephone) or other device (e.g. a personal computer).

Unified messaging systems may be based on various architectures. For example, a unified messaging system may employ a session initiation protocol/voice extensible markup language (SIP/VXML) architecture. As is known, SIP is an application-layer control protocol for creating, modifying, and terminating sessions with one or more users. The sessions may include Internet telephone calls, multi-media distribution, and multi-media conferences. In general, SIP is lightweight, transport-independent, and is text-based.

As is well known, VXML is the world-wide web consortium (W3C) standard for specifying interactive voice dialogues between a human being and a computer. VXML allows voice applications to be developed and deployed in a way analogous to hyper-text markup language (HTML) for visual applications. Similar to how HTML documents are interpreted by a visual browser, VXML, documents are interpreted by a voice browser. In a typical architecture, banks of voice browsers attached to a public switched telephone network (PSTN) are deployed to allow telephone users to interact with voice applications. Today, many commercial VXML applications are deployed that process millions of telephone calls per day. VXML applications include order inquiry, package tracking, driving directions, emergency notification, wake-up, flight tracking, voice access to email, customer relationship management, prescription refilling, audio newsmagazines, voice dialing, real-estate information, national directory assistance applications, etc. VXML employs tags that instruct a voice browser to perform speech synthesis, automatic speech recognition, dialog management, and sound file playback.

Typically, hyper-text transfer protocol (HTTP) is used as the transport protocol for fetching VXML pages. Some applications may use static VXML pages, while other applications employ dynamic VXML page generation using an application server. Two related W3C standards typically used with VXML are speech synthesis markup language (SSML) and speech recognition grammar specification (SRGS). SSML is used to augment textual prompts with information on how best to render the textual prompts in synthetic speech. For example, SSML is used to indicate which speech synthesizer voice to use and when to speak louder. SRGS is used to indicate to a speech recognizer what sentence speech patterns the speech recognizer should expect to receive. Call control extensible markup language (CCXML) is a complementary W3C standard. A CCXML interpreter is used on some VXML platforms to handle initial call setup between a caller and a voice browser and to provide telephony services like call transfer and disconnect for the voice browser. A typical SIP/VXML architecture separates functions to one or more application servers and one or more media servers. In SIP/VXML architectures, the application servers function as masters and the media servers function as slaves. As noted above, messages in a messaging system may take various forms (e.g. an audio file such as a voice mail, a voice memo, or a text-based email) that are played via a text-to-speech application. Irrespective of the form the message takes, the messages may be of various lengths. In a conventional messaging system, the length of the message has not usually been considered when the messaging system is interacting with a user.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION OF THE DRAWINGS

Figure 1:
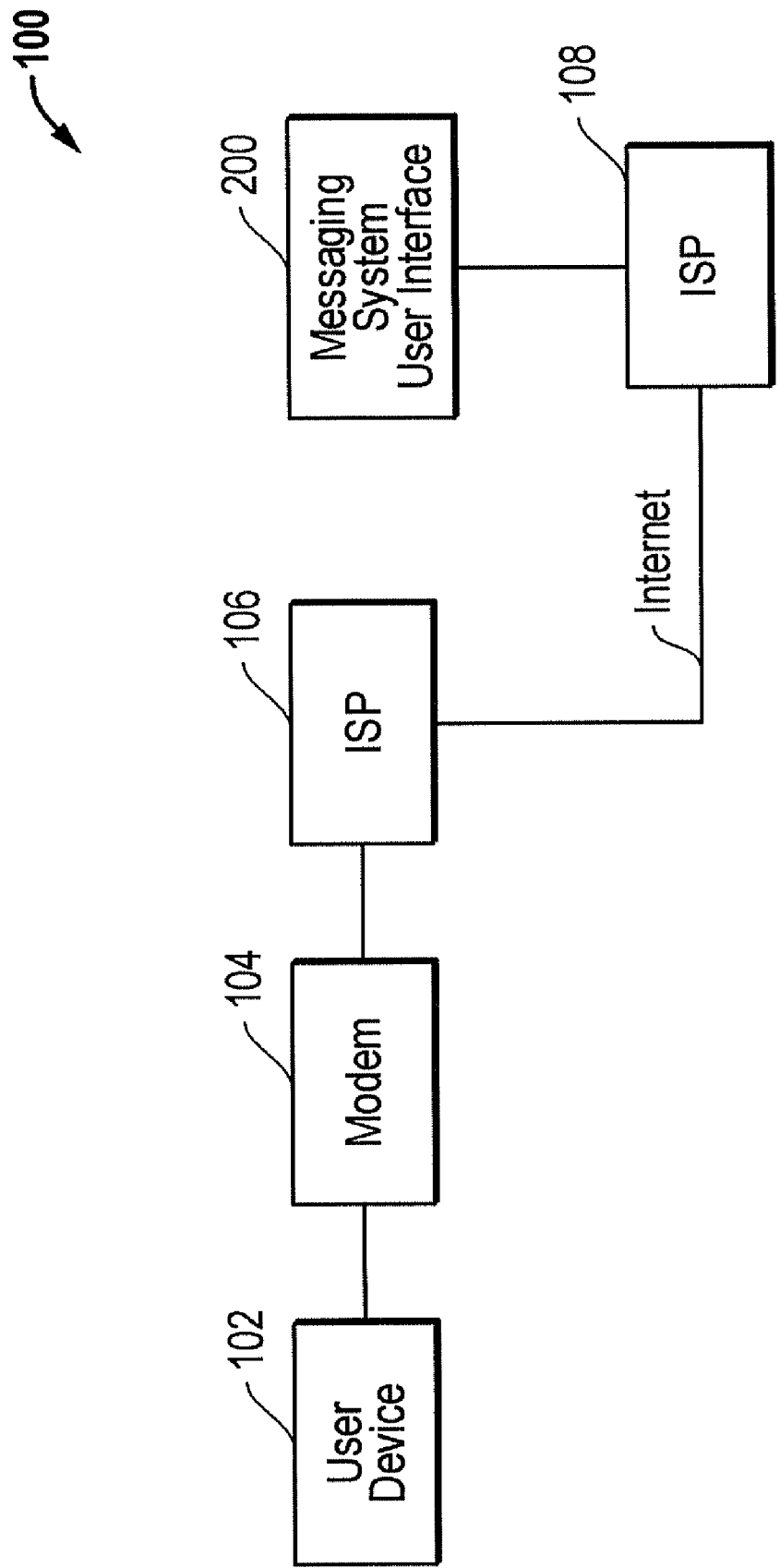
FIG. 1 is an electrical block diagram of example messaging system, configured according to an embodiment of the present disclosure.

According to various aspects of the present disclosure, techniques may be employed within a messaging system that take into account a message length when providing playback of the message to an associated user. According to one or more embodiments, user control inputs, each having a respective function, are implemented to allow a user of a messaging system to specify how a message is provided to the user. A user control input may, for example, correspond to a video cassette recorder (VCR) type function, such as a fast-forward, rewind, pause, or resume. In this manner, a user can better control how longer messages are provided to the user. The user control inputs may take various forms, the user control inputs may correspond to respective dual-tone multi-frequency (DTMF) signals or respective voice inputs. The system may also implement a control function timer to prevent a user from monopolizing system resources for an excessive time period. For example, when a user provides a user control input that corresponds to the pause function, a control function timer may be started. If the control function timer expires before a next user control input is received, the system may be configured to prompt the user for further input. When the pause function is currently employed, for example, the system may prompt the user to resume playback, return to a previous menu, or disconnect the session following expiration of the control function timer.

According to one aspect of the present disclosure, a technique for handling messages in a messaging system includes receiving a playback request for a message. Next, a first user control input is received that is associated with the playback request for the message. The first user control input may correspond to, for example, a fast-forward function or a rewind function. The technique determines whether a second user control input is received prior to expiration of a first time period. In this case, the second user control input corresponds to a same function as the first user control input. Finally, the playback request for the message is serviced using a first offset when the second user control input is not received prior to expiration of the first time period or using a second offset when the second user control input is received prior to expiration of the first time period. In this embodiment, the first and second offsets are different. The first and second offsets correspond to different increments or decrements from a current position (mark position) in a message. For example, when the first control input corresponds to a fast-forward function, the playback of the message is resumed at a location in the message that corresponds to either the first offset or the second offset from a current location in the message. In this manner, a user can better control the playback of messages to fit a need of the user.

According to another aspect of the present disclosure, a user interface for a messaging system includes one or more computer systems that are configured to receive a playback request for a message. The one or more computer systems are also configured to receive a first user control input that is associated with the playback request for the message. The first user control input may correspond to a fast-forward function or a rewind function. The one or more computer systems are further configured to determine whether a second user control input is received prior to expiration of a first time period. In this case, the second user control input corresponds to a same function as the first user control input. The one or more computer systems are also configured to service the playback request for the message using a first offset when the second user control input is not received prior to expiration of the first time period or using a second offset when the second user control input is received prior to expiration of the first time period. In this embodiment, the first and second offsets are different.

According to a different aspect of the present disclosure, a messaging system includes an application server and a media server that is in communication with the application server. The media server is configured to receive a playback request for a message and receive a first user control input that is associated with the playback request for the message. In this embodiment, the first user control input corresponds to a fast-forward function or a rewind function. The media server is further configured to determine whether a second user control input is received prior to expiration of a first time period. In this case, the second user control input corresponds to a same function as the first user control input. The media server is also configured to service the playback request for the message using a first offset when the second user control input is not received prior to expiration of the first time period or using a second offset when the second user control input is received prior to expiration of the first time period. According to this aspect of the present disclosure, the first and second offsets are different.

Pseudo code for implementing message handling using DTMF signals in a messaging system, according to one embodiment of the present disclosure, is set forth below.

```
If DTMF 1 received // rewind
    Mark position
    delta = 10s
    Start inter-event timer
    While inter-event timer has not fired {
        If DTMF 1 received
        delta = delta + 2*delta
    }
    Resume playback at mark position – delta
If DTMF 3 received //fast-forward
    Mark position
    delta = 10s
    Start inter-event timer
    While inter-event timer has not fired {
        If DTMF 1 received
        delta = delta + 2*delta
    }
    Resume playback at mark position + delta
If DTMF 2 received //pause/resume
    If already paused, resume playback
    Else {
    Start max-pause timer
    While max-pause timer has not fired {
    Pause playback }
    Resume playback
    }
```

In the pseudo code set forth above, DTMF tones are utilized to determine what user control function a user has invoked. In this example, a '1' corresponds to a rewind function, a '3' corresponds to a fast-forward function, and a '2' corresponds to a pause/resume function.

In the above pseudo code, when a rewind or a fast-forward function is indicated an inter-event timer is utilized to control how the functions operate. When a user repeatedly presses an appropriate key, a time that the rewind or fast-forward functions utilize is increased. For example, when the appropriate key is pressed once within an inter-event timer period a time period may be set to ten seconds and when the appropriate key is pressed again within the inter-event timer period the time period may be set to thirty seconds. As another example, assuming the appropriate key is pressed two times (three total times) within the inter-event timer period the time period may be set to ninety seconds. It should be appreciated that other formulas may be employed to change a time period corresponding to a given function and that the initial values and formulas may be different for respective functions. As is also apparent from review of the pseudo code, when a '2' is provided by a user to pause playback the code starts a control function timer (max-pause timer). When the max-pause timer expires (fires), an appropriate prompt is provided by the system to the user. For example, when the pause function is currently employed, the system may prompt the user to resume playback, return to a previous menu, or disconnect the session following expiration of the control function timer (max-pause timer). The rewind, fast-forward, pause, and resume functions may be, for example, implemented in VXML 3.0 using, for example, reposition tags.

FIG. 1 shows an example messaging system 100, including a user device 102 (e.g. telephone handset) that is coupled (via a wired or wireless connection) to a modem 104 such as a cable modem. The modem 104 is coupled to an Internet service provider (ISP) 106, which is coupled to the messaging system user interface 200 via an ISP 108. It should be appreciated that the user device 102 may be connected to the Internet in various fashions. For example, when the user device 102 takes the form of a mobile wireless telephone, an Internet connection may be provided via an appropriately connected serving base station. The user interface 200 may include, for example, one or more application computer systems (servers) that are coupled to one or more media computer systems (servers).

Figure 2:
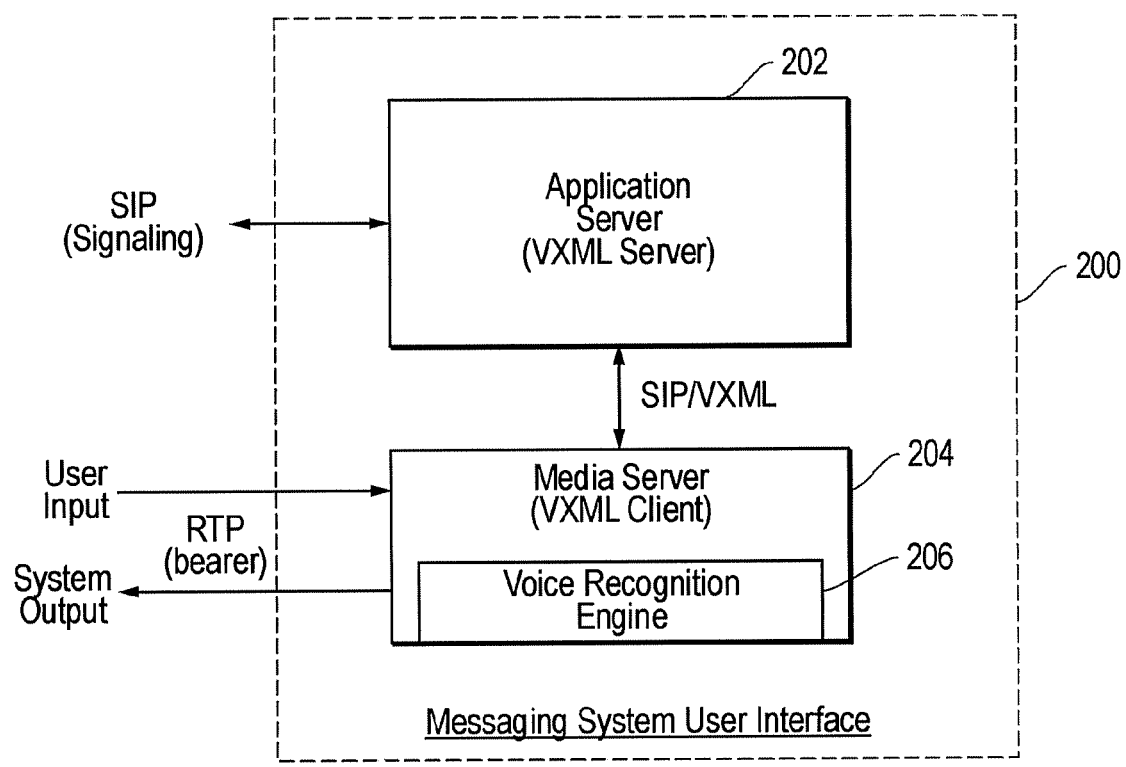
FIG. 2 is an electrical block diagram of an example user interface for the messaging system of FIG. 1.

FIG. 2 shows an example embodiment of the user interface 200 in further detail. The user interface 200 includes an application server 202 that is configured as a VXML server. The application server 202 is coupled to a media server 204 that is configured as a VXML client. The application server 202 and the media server 204 include an application appropriate amount of volatile and non-volatile memory and may each employ one or more processors coupled to the volatile and non-volatile memory. In the illustrated example, the media server 204 executes a voice recognition engine 206. The application server 202 receives information (e.g., packets conforming to SIP) used for call set-up and tear-down from a call control center (not shown), via, for example, an Internet connection. The media server 204 may receive user input in one or more forms (e.g. voice input, DTMF signals, etc.) and provide system output such as prompts, message playback, etc. User input and system output may conform to a real-time transport protocol (RTP), which defines a packet format for delivering audio and video over the Internet. In this example, the application server 202 and the media server 204 communicate using SIP/VXML. It should be appreciated that the techniques for message handling disclosed herein are not limited to messaging systems that utilize SIP/VXML.

Figure 3:
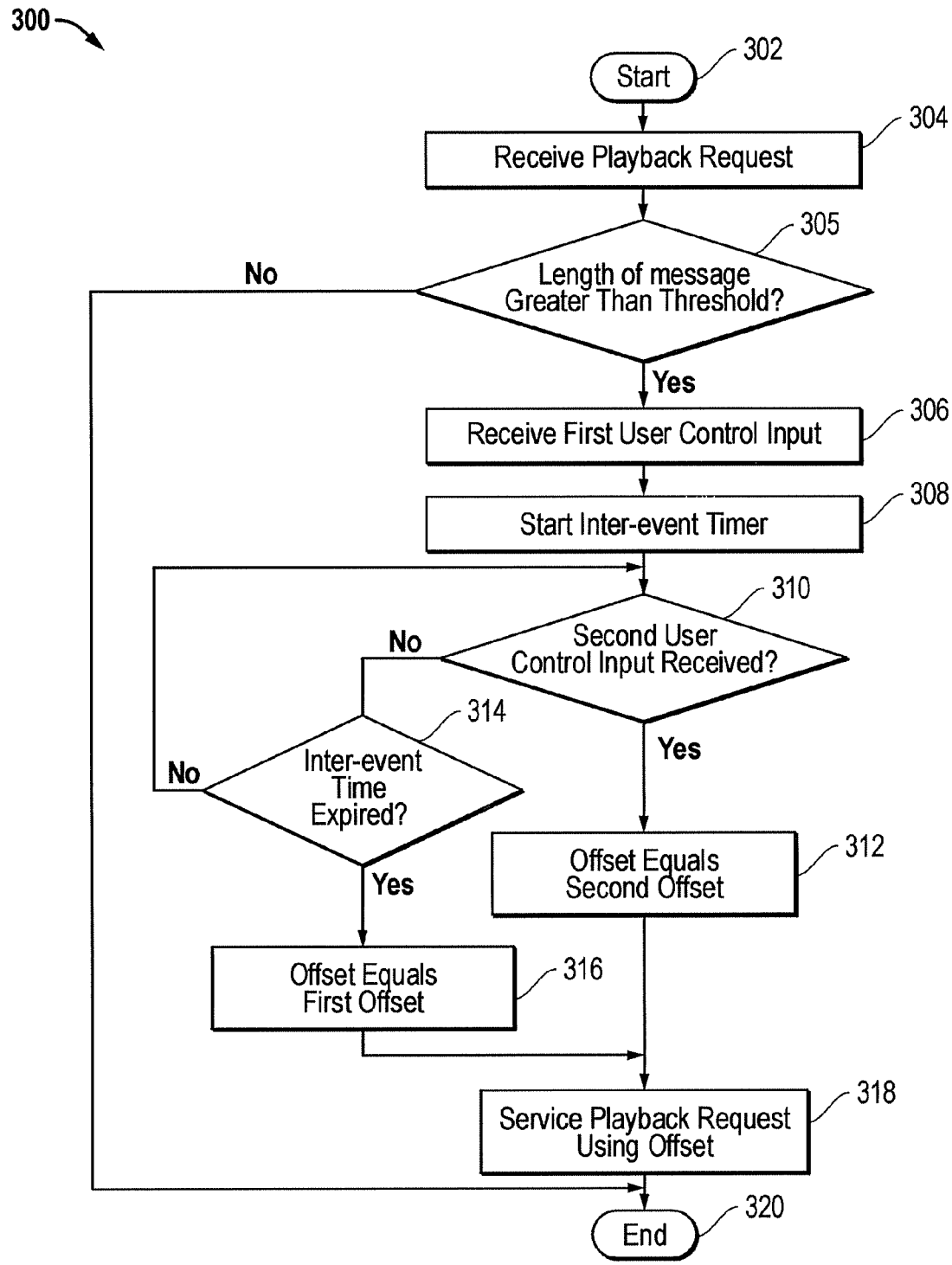
FIG. 3 is a flow chart of an example process for handling messages in the messaging system of FIG. 1.

FIG. 3 shows an example message handling routine 300 configured according to an embodiment of the present disclosure. The routine 300 is initiated in block 302, at which point control transfers to block 304. In block 304, a playback request is received by the user interface 200. Next, in decision block 305, the user interface 200 determines whether a length of a message is greater than a threshold such as ten seconds. If the length of the message is not greater than the threshold, the message is treated as a short message and control transfers to block 320, where control returns to a calling routine. On the other hand, if the length of the message is greater than the threshold in block 305, control transfers to block 306, where a first user control input is received by the user interface 200. The first user control input is provided by the user device 102 and may correspond to, for example, a fast-forward function or a resume function. Then, in block 308, an inter-event timer is started. Next, in decision block 310, the user interface 200 determines whether a second user control input is received. If a second user control input is received in block 310, control transfers to block 312 where an offset is set equal to a second offset that is different from a first offset. The offset is used to determine how far to jump (forward or backward) from a current location in the message that is being provided to a user. In block 310, when a second user control input has not been received, control transfers to block 314. In block 314, the user interface 200 determines whether the inter-event timer has expired. If the inter-event timer has not expired in block 314, control transfers to block 310. If the inter-event timer has expired in block 314, control transfers to block 316, where the offset is set equal to a first offset. Following blocks 312 and 316, control transfers to block 318, where the user interface 200 services the playback request using an appropriate value (first or second offset) for the offset. Next, in block 320, control returns to a calling routine.

Figure 4:
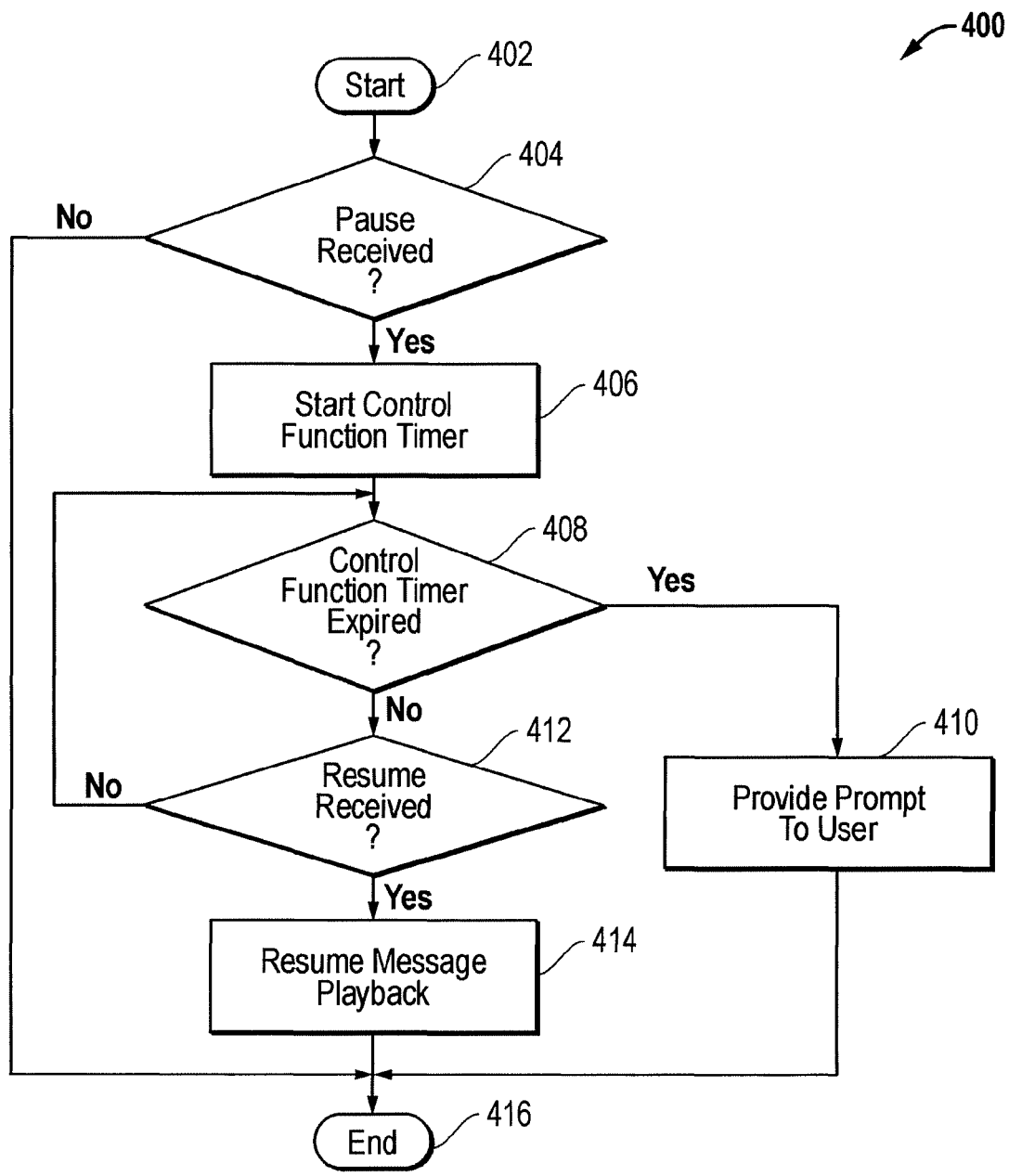
FIG. 4 is a flow chart of another example process for handling messages in the messaging system of FIG. 1.

FIG. 4 shows a message handling routine 400 configured according to another embodiment of the present disclosure. The routine 400 is initiated in block 402, at which point control transfers to decision block 404. In block 404, the user interface 200 determines whether a user control input that corresponds to a pause function has been provided by the user device 102. If a user control input that corresponds to a pause function is received by the user interface 200, control transfers from block 404 to block 406, where a control function timer is started. The control function timer is implemented to reduce monopolization of system resources by a given user. Next, in block 408, the user interface 200 determines whether the control function timer has expired. If the control function timer has expired in block 408, control transfers to block 410 where the user interface provides a prompt to the user, before transferring control to block 416. In block 416, control returns to a calling routine. If the control function timer has not expired in block 408, control transfers to decision block 412 where the user interface 200 determines whether a user control input that corresponds to a resume function has been received. The user control inputs for the resume function and the pause function may or may not correspond to a same user control input. If a user control input that corresponds to the resume function is received in block 412, control transfers to block 414, where the user interface 200 resumes providing message playback. Following block 414, control transfers to block 416 where control transfers to a calling routine.

Figure 5:
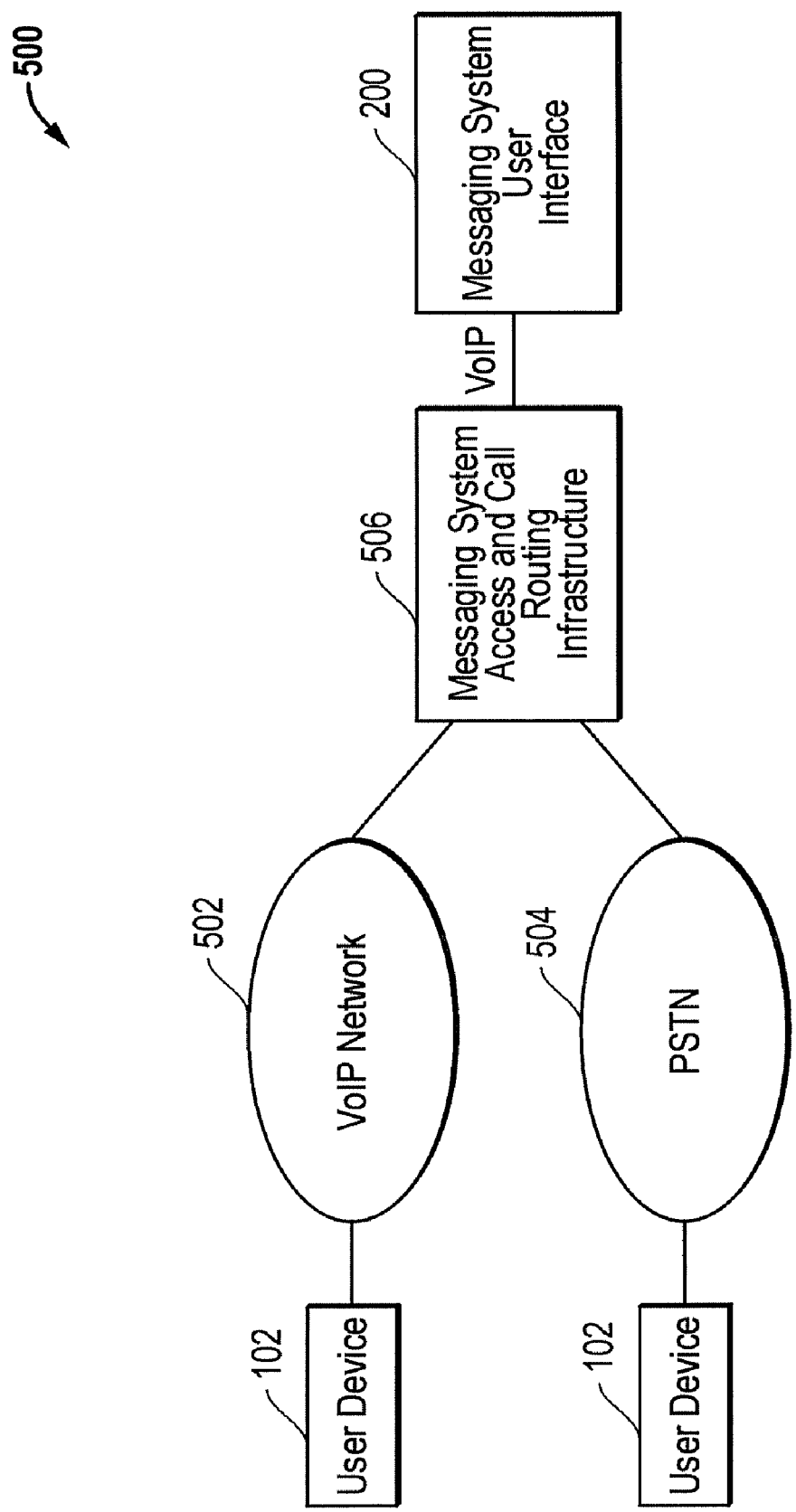
FIG. 5 is an electrical block diagram of another example messaging system, configured according to another embodiment of the present disclosure.

FIG. 5 shows another example messaging system 500, including multiple of the user devices 102, such as telephone handsets. One of the user devices 102 is in communication with a public switched telephone network (PSTN) 504 and another one of the user devices 102 is in communication with a voice over Internet protocol (VoIP) network 502, e.g., an IP multimedia system (IMS). The VoIP network 502 and the PSTN 504 are in communication with a messaging system access and call routing infrastructure 506, which is coupled to the messaging system user interface 200, via, for example, a VoIP connection. As noted above, the user interface 200 is configured to provide messaging services to the user devices 102 and may include, for example, one or more application computer systems (servers) that are coupled to one or more media computer systems (servers).

Accordingly, techniques have been disclosed herein that provide improved message handling in a messaging system. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for handling messages in a messaging system, comprising:
    receiving a playback request for a message;
    initiating playback of the message in response to the request;
    receiving, at a first time after the initiating, a first user control input that is associated with the playback request for the message, the first user control input corresponding to a fast-forward function or a rewind function;
    discontinuing playback of the message in response to receiving the first user control input;
    determining whether a second user control input is received prior to expiration of a first time period, the first time period beginning at the first time, the second user control input corresponding to a same function as the first user control input; and
    resuming playback of the message, in response to the second user control input, at a first offset when the second user control input is not received prior to expiration of the first time period and at a second offset when the second user control input is received prior to expiration of the first time period, wherein the first and second offsets correspond to different temporal positions within the message.

2. The method of claim 1, wherein the first offset corresponds to a second time period and the second offset corresponds to a third time period, the third time period having a duration that is about twice the duration of the second time period.

3. The method of claim 1, further comprising:
    starting a control function timer following receipt of a third user control input, wherein the third user control input corresponds to a pause function; and
    prompting a user to provide input to the messaging system following expiration of the control function timer.

4. The method of claim 1, further comprising:
    determining a duration of the message; and
    disregarding the first user control input when the duration of the message is not greater than a threshold value.

5. The method of claim 1, wherein the messaging system is based on a session initiation protocol and voice extensible markup language architecture.

6. The method of claim 1, wherein the first and the second user control inputs correspond to respective dual-tone multi-frequency signals.

7. The method of claim 1, wherein the first and the second user control inputs correspond to respective voice signals.

8. A user interface for a messaging system, the user interface comprising:
    one or more computer systems configured to:
    receive a playback request for a message;
    initiate playback of the message in response to the request;
    receive, at a first time after the initiating, a first user control input that is associated with the playback request for the message, the first user control input corresponding to a fast-forward function or a rewind function;
    discontinue playback of the message in response to receiving the first user control input;
    determine whether a second user control input is received prior to expiration of a first time period, the first time period beginning at the first time, the second user control input corresponding to a same function as the first user control input; and
    resume playback of the message, in response to the second user control input, at a first offset when the second user control input is not received prior to expiration of the first time period and at a second offset when the second user control input is received prior to expiration of the first time period, wherein the first and second offsets correspond to different temporal positions within the message.

9. The user interface of claim 8, wherein the first offset corresponds to a second time period and the second offset corresponds to a third time period, the third time period having a duration that is about twice the duration of the second time period.

10. The user interface of claim 8, wherein the one or more computer systems are further configured to:
    start a control function timer following receipt of a third user control input, wherein the third user control input corresponds to a pause function; and
    prompt a user to provide input to the messaging system following expiration of the control function timer.

11. The user interface of claim 8, where in the one or more computer systems are further configured to:
    determine a duration of the message; and
    disregard the first user control input when the duration of the message is not greater than a threshold value.

12. The user interface of claim 8, wherein at least one of the one or more computer systems is configured as an application server and at least another one of the one or more computer systems is configured as a media server, and wherein the applications server is a voice extensible markup language server and the media server is a voice extensible markup language client, where communication between the application server and the media server is based on a session initiation protocol and voice extensible markup language architecture.

13. The user interface of claim 8, wherein the first and the second user control inputs correspond to respective dual-tone multi-frequency signals.

14. The user interface of claim 12, wherein the media server includes a voice recognition engine and the first and the second user control inputs correspond to respective voice signals.

15. A messaging system, comprising:
    an application server; and
    a media server in communication with the application server, wherein the media server is configured to:
    receive a playback request for a message;
    initiate playback of the message in response to the request;
    receive, at a first time after the initiating, a first user control input that is associated with the playback request for the message, the first user control input corresponding to a fast-forward function or a rewind function;
    discontinue playback of the message in response to receiving the first user control input;
    determine whether a second user control input is received prior to expiration of a first time period, the first time period beginning at the first time, the second user control input corresponding to a same function as the first user control input; and
    resume playback of the message, in response to the second user control input, at a first offset when the second user control input is not received prior to expiration of the first time period and at a second offset when the second user control input is received prior to expiration of the first time period, wherein the first and second offsets correspond to different temporal positions within the message.

16. The messaging system of claim 15, wherein the first offset corresponds to a second time period and the second offset corresponds to a third time period, the third time period having a duration that is about twice the duration of the second time period.

17. The messaging system of claim 16, wherein the media server is further configured to:
    start a control function timer following receipt of a third user control input, wherein the third user control input corresponds to a pause function; and
    prompt a user to provide input to the media server following expiration of the control function timer.

18. The messaging system of claim 17, the media server is further configured to:
    determine a duration of the message; and
    disregard the first user control input when a duration of the message is not greater than a threshold value.

19. The messaging system of claim 18, wherein the application server is a voice extensible markup language server and the media server is a voice extensible markup language client, and wherein communication between the application server and the media server is based on a session initiation protocol and voice extensible markup language architecture.

20. The messaging system of claim 19, wherein the first, second, and third user control inputs correspond to respective dual-tone multi-frequency signals or to respective voice signals.

* * * * *